United States Patent [19]

Henricson et al.

[11] Patent Number: 5,360,514

[45] Date of Patent: Nov. 1, 1994

[54] TREATMENT OF BLEACH PLANT FILTRATIONS USING A MAGNESIUM FILTER

[75] Inventors: Kaj Henricson; Anja Klarin, both of Helsinki, Finland

[73] Assignee: Kamyr, Inc., Glens Falls, N.Y.

[21] Appl. No.: 31,432

[22] Filed: Mar. 15, 1993

Related U.S. Application Data

[63] Continuation-in-part of Ser. No. 861,387, Mar. 31, 1992, which is a continuation-in-part of Ser. No. 839,389, Feb. 21, 1992.

[51] Int. Cl.$^5$ ............................................. D21C 11/00
[52] U.S. Cl. ........................... 162/31; 162/37; 162/42; 162/43; 162/44; 162/60; 162/65; 162/78; 210/758; 210/912; 210/928
[58] Field of Search ............ 162/29, 31, 60, 45, 162/43, 44, 37, 38, 39, 65, 76, 78; 210/928, 758, 912

[56] References Cited

U.S. PATENT DOCUMENTS

| | | | |
|---|---|---|---|
| 4,543,155 | 9/1985 | Stawick | 162/65 |
| 4,568,420 | 2/1986 | Nonni | 162/65 |
| 4,761,238 | 8/1988 | Hynninen | 162/45 |
| 4,946,556 | 8/1990 | Prough | 162/60 |
| 5,164,044 | 11/1992 | Griggs et al. | 162/65 |

OTHER PUBLICATIONS

Murray "A Sacrificial Metal Corrosion Control Process"; *Water & Sewer Work*, Jan. 1966 pp. 19–26.

*Primary Examiner*—Steve Alvo
*Attorney, Agent, or Firm*—Nixon & Vanderhye

[57] ABSTRACT

In the bleaching of paper pulp without chlorine, such as using an OTZE or OZP bleach sequence, filtrate from subsequent stages is used as a wash liquid in preceding wash stages. The filtrate is treated with a fiber filter, and then passes through a magnesium filter, which has magnesium chips with a maximum dimension of about 3 mm or less. The magnesium removes heavy metal ions, and if any of the magnesium dissolves in the filtrate it provides a beneficial affect on the pulp. The pH of the filtrate is typically maintained in the 2–6 range to facilitate dissolution of Cu, Mn and Fe while the magnesium stays out of solution. Two filters may be provided in parallel so that if one becomes contaminated the other may be quickly put into service, and any explosive gases from the magnesium filter are vented.

10 Claims, 4 Drawing Sheets

TREATMENT OF BLEACH PLANT FILTRATIONS USING A MAGNESIUM FILTER

RELATED APPLICATIONS

This application is a continuation-in-part of application Ser. No. 07/861,387 filed Mar. 31, 1992, which in turn is a continuation-in-part of application Ser. No. 07/839,389 filed Feb. 21, 1992, the disclosure of which is hereby incorporated by reference herein.

BACKGROUND AND SUMMARY OF THE INVENTION

Utilizing procedures such as described in application Ser. No. 07/839,389, the environmental impact front the production of kraft pulp can be greatly minimized. Utilizing the techniques described in that application, and employing a few additional techniques according to the present invention, it is possible to "close" a bleaching system of a kraft pulping facility so that there is no or very small discharge of washing filtrates, or the like, into the environment; or it is possible to substantially close the bleaching system so that the only discharge from the washing/bleaching system is a small stream of wash filtrate used in smelt dissolution (or effectively treated so that there is essentially zero pollution associated with it when discharged).

Perhaps the most promising bleaching chemical for allowing chlorine to be eliminated while still achieving effective bleaching, is ozone. While ozone has been known as a bleaching agent for a long time, it has not been commercially used on an industrial scale in pulp production until very recently in view of recent rapid developments in machine and process technologies, because of long standing problems.

A major problem encountered in utilizing ozone is high ozone consumption. Ozone consumption may be unreasonable high if there are too many metallic ions, which react with the ozone, or if the ozone reacts with organic material in the liquid phase of the pulp rather than reacting with the pulp fibers. It is highly desirable to have the ozone react only with fibers so that the ozone consumption is minimized, making ozone bleaching practical as well as effective, and allowing "closing" of a bleach plant.

As disclosed in application Ser. No. 07/839,389, one way in which the volume of metallic ions can be decreased is by improving the washing after the acid stage, where the majority of the metallic ions are dissolved. Another way to reduce the load of metallic ions, according to parent application Ser. No. 07/861,387, is to utilize an electrical potential. The electrical potential can be applied over the washer, or the filtrate supplied to the washer, or even to the pulp prior to the ozone stage. A preferred way to apply the electric field is to have the filtrate being used as washwater to go through a chamber where there is a suitable electric potential. In this way the filtrate is cleaned of metallic ions before being used as wash water. The electrical potential can effect sufficient removal of ions so as to allow complete closing of the bleaching plant, or to provide that the amount of wash filtrate from the acid stage is so small that it is completely consumed in smelt dissolution, and cooking liquor preparation.

According to the present invention, the amount of organic material in the liquid phase is made non-attractive to the ozone by oxidizing the organic material. Since ozone is a strong oxidant, it is more likely to react with the fibers than with the already oxidized organic material in the liquid phase. It is perhaps not possible to oxidize all dissolved material in the liquid phase, but a considerable part can be oxidized with oxygen prior to applying the ozone. However there is always a significant amount of organic material in the wash filtrates used during washing of the pulp prior to the ozone stage so that if that organic material is oxidized, the ozone consumption in the following ozone bleaching stage can be significantly reduced.

According to one aspect of the present invention, a method of treating filtrates from bleach plants for bleaching cellulosic pulp, including utilizing at least one ozone, $H_2O_2$, or oxygen bleaching stage, is provided. The method comprises the steps of: (a) Washing the pulp in a washer with a wash liquid prior to the ozone, $H_2O_2$, or oxygen bleaching stage, the wash liquid including filtrate from another washing stage of a bleaching stage. (b) Oxidizing the organic material in the filtrate used as wash liquid in step (a) prior to its use in step (a) in order to make the organic material less attractive to bleaching chemical in the bleaching stage. And, (c) ozone, $H_2O_2$, or oxygen bleaching the washed pulp in the at least one ozone, $H_2O_2$, or oxygen bleaching stage. Step (b) may be practiced by indirectly heating the filtrate (as with already oxidized filtrate in the heat exchanger), and then reacting the heated filtrate with oxygen containing gas, such as oxygen carrier gas with residual ozone discharged from an ozone bleaching stage. Alkali can be added to the filtrate and oxygen during the reacting step if desired.

According to the invention, there is also the further step (d) of removing metallic ions from the filtrate so as to minimize the consumption of bleaching chemical in step (c), by passing the filtrate through a magnesium filter, such as a magnesium chip filter. Such a filter especially removes Mn, Fe, and Cu all of which consume bleaching chemicals. Mg, on the other hand, has a positive effect on bleaching.

All of the steps are preferably practiced with the pulp at a medium consistency, e.g. of about 5-18% (preferably about 8-15%).

Practicing the present invention, and the techniques from the parent application, a method of continuously kraft pulping and then bleaching comminuted cellulosic fibrous material may be provided which comprises the following steps: (a) Continuously digesting the material to produce pulp having a Kappa Number comparable to about 20 or below for softwood. (b) Subjecting the digested pulp to hot alkali extraction and/or oxygen bleaching so as to produce pulp having a Kappa Number comparable to about 10 or below for softwood. (c) Effecting bleaching of the pulp with non-chlorine containing bleaching chemicals to obtain a bleached pulp having properties comparable to CK pulp bleached with a DEDED sequence. (d) Effecting washing of the pulp with wash filtrates, and to produce wash filtrates, during the practice of step (c). And, (e) treating and recirculating the wash filtrates from step (d) so as to discharge no, or a small amount of, wash filtrates into the environment. Step (c) includes at least one ozone bleaching stage, and step (d) includes washing the pulp with wash filtrate just prior to the ozone bleaching stage; and comprising the further step (f) of oxidizing organic material in the wash filtrate prior to the washing of the pulp just prior to the ozone bleaching so as to make the organic material less attractive to ozone in the ozone bleaching stage. The bleaching sequences may be as described in the parent application, e.g. they may be selected from the group consisting essentially of OOA-ZEZPZ, OAZEZPZ, OOAZEZP, and OAZEZP, or AZEZPZ or AZEZP if oxygen bleaching is used to lower the Kappa Number to about 10.

Alternatively, step (e) may be the step of treating and recirculating all of the wash filtrates in step (d) so that the only wash filtrate discharged from the washing of step (d) is a small stream used for smelt dissolution (cooking liquor production). If all of the small stream cannot be taken to cooking liquor preparation (smelt dissolution and other associated processes), it is taken to black liquor evaporation. It can be taken to black liquor evaporation directly or by taking it to the brown stock washing plant.

It is the primary object of the present invention to minimize ozone consumption in the ozone bleaching of cellulosic pulp, and/or to produce a closed, or substantially closed, bleach plant in a pulp mill. This and other objects of the invention will become clear from an inspection of the detailed description of the invention and from the appended claims.

DETAILED DESCRIPTION OF THE DRAWINGS

Figure 1:
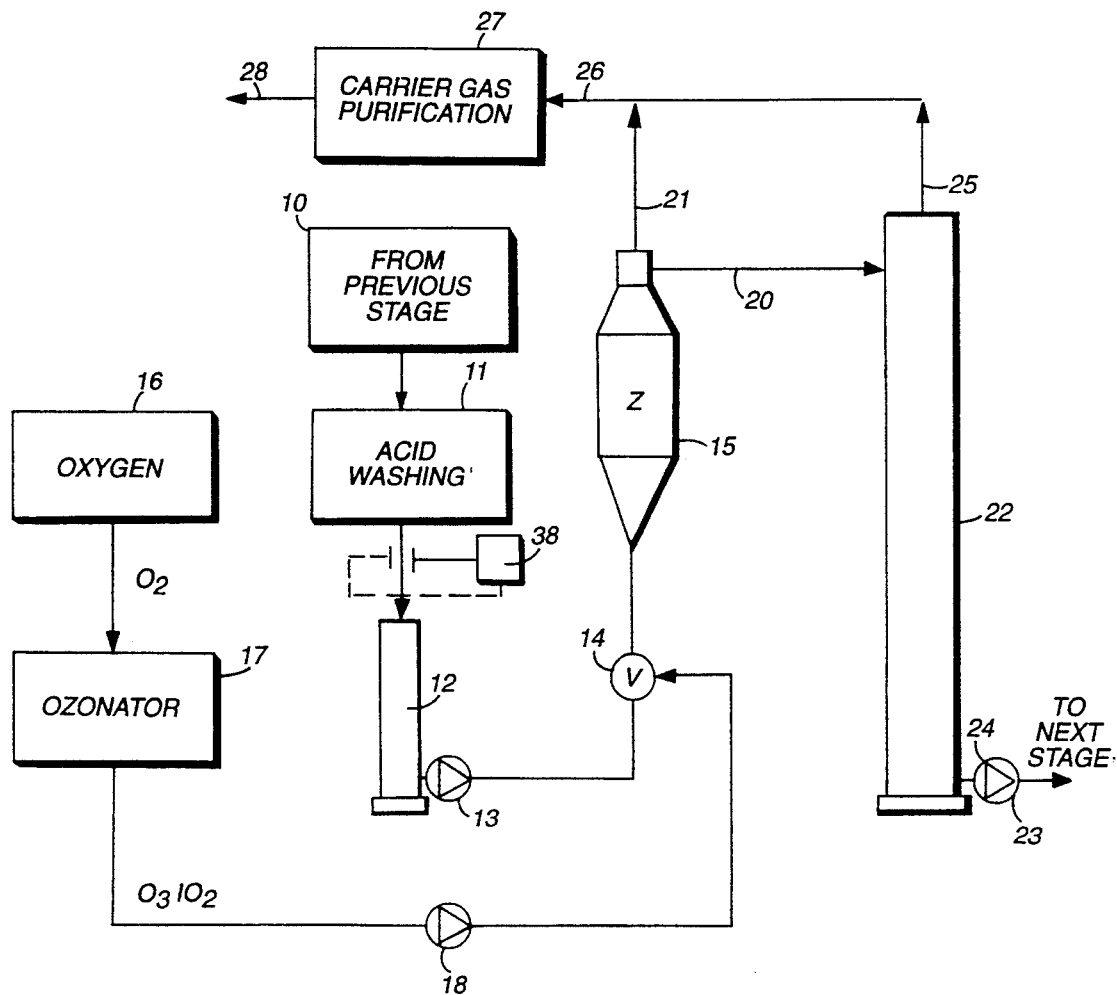
FIG. 1 is a schematic representative of an ozone bleaching stage in a cellulosic pulp bleaching plant.

FIG. 1 schematically illustrates a typical ozone bleaching stage, such as utilized in the chlorine free pulping and bleaching sequence of the parent application, for the practice of the invention. Pulp from a previous stage 10 in the pulping sequence is subjected to acid washing 11, and then fed to a retention vessel 12 from which it is pumped by pump 13 through mixer 14 to the reactor 15. The pulp may be a medium consistency (e.g. about 5-8%), or low consistency. If a medium consistency, a MC ® mixer, sold by Kamyr, Inc. of Glens Falls, N.Y., may be utilized to intimately mix the ozone with the pulp.

Oxygen from source 16, which is essentially pure oxygen (e.g. over 90% oxygen) may be treated by ozonator 17, and then pumped by a pump 18 to the mixing element 14 to be mixed with the pulp prior to reactor 15. The element 14 may be a valve or an MC ® mixer.

The ozone bleached pulp is discharged in line 20, while carrier gas (oxygen), with residual ozone, is discharged at 21. The pulp passes to one or more tanks or vessels 22, subsequently being discharged in line 23, under the influence of pump 24, to a washer and then to the next pulping stage. Oxygen gas is discharged from vessel 22 into line 25, combined with the discharge gas in line 21 in line 26, and it may be purified in the gas treatment stage 27 so that the gas in line 28 consists essentially of oxygen, perhaps with a small amount of residual ozone.

Figure 2:
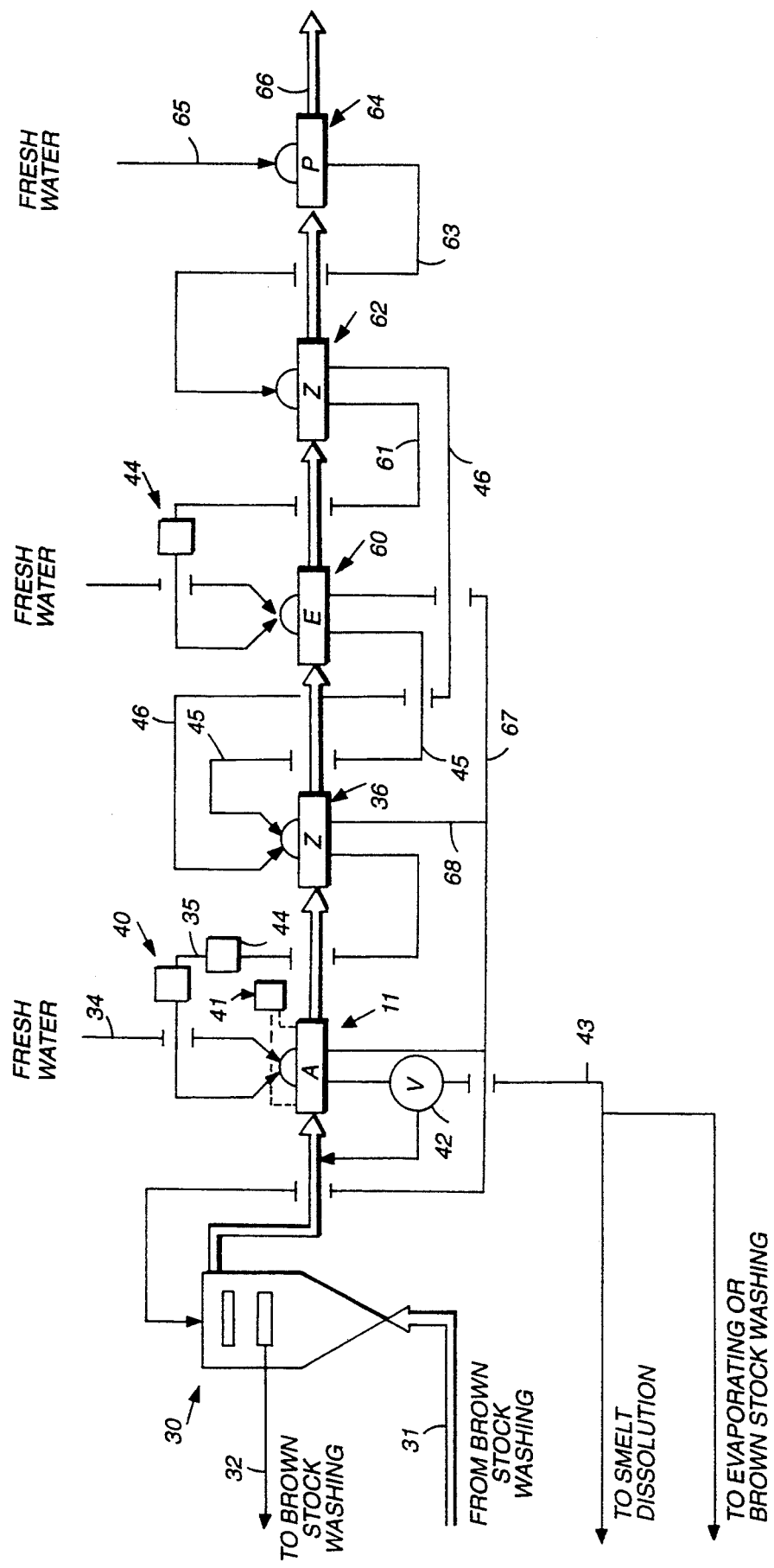
FIG. 2 is a schematic view of the wash aspects of a typical non-chlorine bleaching sequence showing the liquid flow interconnections between the various stages, and schematically illustrating treatments of the filtrates as according to the invention.

FIG. 2 illustrates details of the washing sequences that may be associated with a typical non-chlorine bleaching sequence as described in the parent application. FIG. 2 is essentially the same as FIG. 2 in the parent application, only it illustrates various other treatment mechanisms according to the invention. The diffusion washer 30 receives pulp in line 31 from brown stock washing. The pulp in line 31 has already been continuously digested, as with the Kamyr modified continuous cooking process described in the parent application so that the Kappa Number has been reduced to about 20 or below for softwood, and has already been subjected to hot alkali extraction and/or oxygen bleaching so that it has a Kappa Number for softwood of about 10 or below. Typically one or more oxygen delignification (bleaching) stages have also been utilized, and ultimately the pulp will be bleached with non-chlorine containing bleaching chemicals to obtain a bleached pulp having properties comparable to conventional kraft pulp ("CK") bleached with a DEDED sequence. From the diffusion washer 30, filtrate is returned in line 32 to brown stock washing.

The acid washing stage 11 is supplied with fresh water in line 34, and filtrate from other washing stages of the bleaching sequence in line 35. For example line 35 is connected up to the washer 36 for the first ozone stage. According to the present invention, metallic ions can be removed from the system by utilizing the apparatus 38 in FIG. 1, and/or apparatus 40 and/or 41 in FIG. 2. As illustrated in FIG. 1, the electrical potential can be applied by the mechanism 38 directly to the pulp between the acid washing stage 11 and the vessel 12 (at the start of the ozone stage) in addition to, or instead of, the mechanisms 40, 41. Apparatus 40 applies an electrical potential to the filtrate in the line 35, while apparatus 41 applies an electrical potential across the entire washer 11, the electrical potential effecting removal of a substantial number of metallic ions from the system, and thus the pulp being fed to the ozone stage.

The filtrate discharged from washer 11 may pass through a valve 42 to go into the line 43 for smelt dissolution (or other part of the cooking liquor production), or treatment, while at least part is recirculated to the pulp being fed to the washer 11. Depending upon the effectiveness of the bleaching and washing stages, the removal of metallic ions, and the like, the valve 42 may be adjusted so that the stream in line 43 is either just a small stream only sufficient for cooking liquor preparation, or so that the line 43 is completely closed off so that no filtrates from the washing system associated with the bleaching sequence of FIG. 2 go out from the fiberline. It is also possible to take filtrate to the black liquor evaporation plant or some part of the brown washing system and thus ultimately burn the contaminants in the recovery boiler.

Figure 3:
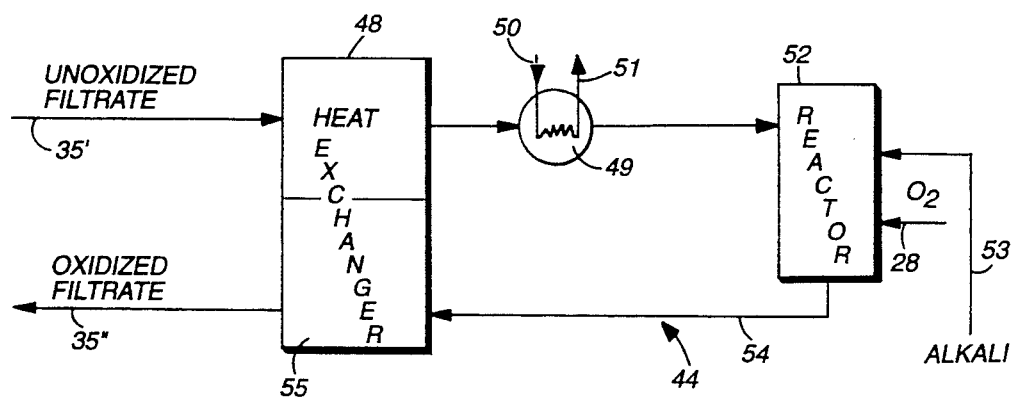
FIG. 3 is a schematic representation of one of the particular filtrate treatments shown only as a block in FIG. 2.

According to the present invention, apparatus 44 is utilized in association with the washing stage prior to each ozone bleaching stage to make organic material in the liquid phase less attractive to the ozone. The structure 44 treats the filtrate in the washer prior to the ozone stage, and after the bleaching stage prior to the ozone stage. A typical apparatus 44 is illustrated in more detail in FIG. 3.

Unoxidized filtrate in line 35' (part of 35) passes to the heat exchanger compartment 48 where it is brought into heat exchange relationship with oxidized filtrate in line 35". In order to improve oxidation and heat economy, in addition to using the heat exchanger 48 another indirect heat exchanger 49 may be utilized which has line 50 leading into it and line 51 leading away from it. Hot water or steam may be supplied to the line 50 so that the unoxidized filtrate is heated. The unoxidized filtrate is then fed to a reactor 52 where oxygen containing gas, typically consisting essentially of oxygen (perhaps with some residual ozone) is added. The oxygen may be from the line 28 (see FIG. 1).

Oxidation also may be improved by adding alkali in line 53 to the reactor 52. Adding alkali keeps the pH high, and may be desirable since carbon dioxide which is favored during oxidation lowers the pH. However if one desires the pH to drop during oxidation and thus obtain an acid filtrate, which can be used to lower the pH of the Z stage following the washer 11, no alkali will be added in line 53. Residual gases remaining after the oxidation takes place in reactor 52 can either be removed in the reactor 52, or after cooling the oxidized filtrate in heat exchanger chamber 55 to which the oxidized filtrate is supplied via line 54. The oxidized filtrate in line 35" (part of 35) then proceeds to the washer 11 (e.g. through the structure 40).

FIG. 2 also illustrates various other washers and lines, including the washer 60 for the E stage supplied with filtrate from line 61, which is connected to the washer 62 from the second Z stage, which in turn is supplied with filtrate from line 63, connected to the washer 64 associated with the P stage. Fresh water is supplied to the washer 64 via line 65, and the bleached pulp that is produced is discharged in line 66. Filtrate from line 67, connected to washer 60, and from line 68, connected to washer 36, may be supplied to the diffusion washer 30. It is noted that an oxidizing unit 44 is associated with the washer 60 prior to the second ozone stage (having washer 62) too.

Utilizing the system and procedure described above, a closed system, or a substantially closed system, may be provided, in which there is no discharge of filtrates from the bleaching plant, or a minimal discharge (in line 43). An example of the filtrate volume associated with 1, 2, or 3 ozone stages is illustrated in the following tables.

As can be seen from Table 1, the amount of filtrate going into the washers before the first and second ozone stages ($Z_1$ and $Z_2$) in the closed system is 6.7−2.5=4.2 m$^3$/ton/filter, and in a substantially closed system 6.7−4.0=2.7 m$^3$/ton pulp/filter. In this case when the consistency of the pulp during washing is 15%, about 6.7 m$^3$ of total wash water is used on each filter. If a washer consistency of 10% had been used, the use of total wash water on the washer would have been about 10 m$^3$/ton pulp/washer, and the use of a filtrate would have been somewhat higher than in the above calculations. These relatively small recirculated filtrate flows (e.g. 2.7–4.2 m$^3$/ton pulp/washer) to the washers ahead of each of the Z stages can easily be oxidized by the oxygen gas in line 28. Also, Table 2 shows that the amount of metallic ions is small enough so as to be effectively handled too.

TABLE 1

Water Usage in Bleach Plant

| System | Fresh Water Usage m$^3$/ton pulp | | | Waste Water m$^3$/ton pulp |
| --- | --- | --- | --- | --- |
|  | $Z_1$ | $Z_2$ | $Z_3$ |  |
| Closed | 2.5 | 2.5 | 6.7 | 4.3 |
| Substantially Closed | 4.0 | 4.0 | 6.7 | 7.3 |
| Open | 6.7 | 6.7 | 6.7 | 12.7 |

The waste water streams in Table 1 can be taken to white liquor preparation, particularly smelt dissolution. About 2–4 m$^3$ can be used for this purpose. The rest of the waste water can be taken to brown stock washing, or black liquor evaporation. Also some, especially in the open case, may have to go to waste water treatment.

TABLE 2

Metallic Ions Distribution

| System | Metallic ions % of total dissolved in A-stage | | | Waste Water |
| --- | --- | --- | --- | --- |
|  | $Z_1$ | $Z_2$ | $Z_3$ |  |
| Closed | 25% | 2% | 2% | 75% |
| Substantially Closed | 15% | 1% | 1% | 90% |
| Open | 10% | <1% | <1% | 95% |

TABLE 3

Accumulation of Organic Material

| System | Dissolved Organic Material Present in Stage kg/ton Pulp | | |
| --- | --- | --- | --- |
|  | $Z_1$ | $Z_2$ | $Z_3$ |
| Closed | 9 | 10 | 2 |
| Substantially Closed | 4 | 6 | 2 |
| Open | 2 | 3 | 2 |

Practicing the present invention, and the techniques from the parent application, a method of continuously kraft pulping and then bleaching comminuted cellulosic fibrous material may be provided which comprises the following steps: (a) Continuously digesting the material to produce pulp having a Kappa Number comparable to about 20 or below for softwood. (b) Subjecting the digested pulp to hot alkali extraction and/or oxygen bleaching so as to produce pulp having a Kappa Number comparable to about 10 or below for softwood. (c) Effecting bleaching of the pulp with non-chlorine containing bleaching chemicals to obtain a bleached pulp having properties comparable to CK pulp bleached with a DEDED sequence. (d) Effecting washing of the pulp with wash filtrates, and to produce wash filtrates, during the practice of step (c). And, (e) treating and recirculating the wash filtrates from step (d) so as to discharge no, or a small amount of, wash filtrates into the environment. Step (c) includes at least one ozone bleaching stage, and step (d) includes washing the pulp with wash filtrate just prior to the ozone bleaching stage; and comprising the further step (f) of oxidizing organic material in the wash filtrate prior to the washing of the pulp just prior to the ozone bleaching so as to make the organic material less attractive to ozone in the ozone bleaching stage. The bleaching sequences may be as described in the parent application, e.g. they may be selected from the group consisting essentially of OOA-ZEZPZ, OAZEZPZ, OOAZEZP, and OAZEZP, or AZEZPZ or AZEZP if oxygen bleaching is used to lower the Kappa Number to about 10.

Figure 4:
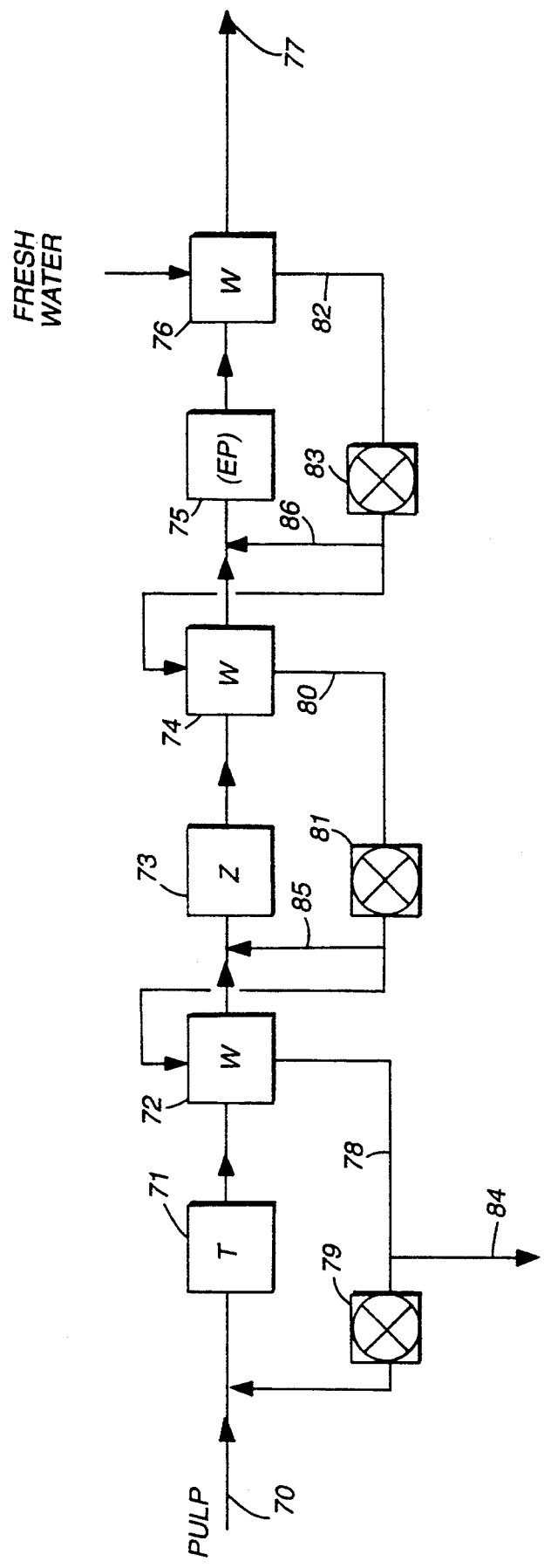
FIG. 4 is a schematic view like that of FIG. 2 only showing the utilization of magnesium filters according to the invention.

FIG. 4 schematically illustrates a bleaching sequence according to the present invention with filter recirculation and with treatment of the filtrate so as to minimize the accumulation of COD and heavy metal ions in the system. Pulp in line 70 is preferably from an EMCC® digester (from Kamyr, Inc. of Glens Falls, N.Y.) which passes to a T stage, where there is treatment with EDTA or the like (e.g. at a pulp consistency of about 10%, with a dosage of EDTA of about 2 kilograms per ton of pulp, a temperature of about 50° C., and a treatment time of about 30 minutes), after which the pulp passes to a wash stage 72, then to a Z (ozone bleaching) stage 73, then to another wash stage 74, an (EP) stage 75, for caustic extraction and peroxide bleaching, and then to a washer 76, the final pulp 77 being produced.

In the Z stage, the target pH is about 3.0, which may be achieved by adjusting the pH of filtrate provided just before the stage 73 (in line 85) with sulfuric acid to about 2.15. In the Z stage 73 the pulp consistency is about 10%, the temperature about 20° to 30° C., and the ozone dosage about 7 kilograms per ton of pulp.

In the T stage, the treatment may be with acid, or EDTA and acid, and its primary purpose is to remove metals.

In the (EP) stage 75, the pulp consistency is about 10%, the sodium hydroxide dosage about 15 kilograms per ton of pulp, the peroxide dosage about 3 kilograms per ton of pulp, the temperature about 70° C., and the treatment time about 60 minutes.

The pulp in line 70, as earlier indicated, is typically oxygen delignified commercial soft wood kraft pulp, having a consistency of about 28%, and is diluted with water (filtrate) from washing stage 72, the filtrate passing in line 78 through a magnesium filter 79 to the line 70. The wash liquid for the wash stage 72 is supplied in line 80 from wash stage 74, passing through magnesium filter 81. The washer 74 is provided with wash water in the form of filtrate in line 82 from third washer 76, passing through magnesium filter 83. Typically fresh water is used as the wash water for the third washing stage 76.

In each of the filtrate lines 78, 80, 82, a portion of the liquid may be removed so that the consistency of the pulp being treated is maintained at a desired level. The filtrate in line 84 could be passed to disposal or treatment, while the filtrate in lines 85 and 86 enters the pulp stream prior to a bleaching stage. The pH of the fiber suspension may be reduced by adding acid, such as sulfuric acid although many other acids can be used, to the suspension before a washer. The acid can be added directly to the pulp or to dilution water entering the fiber suspension, such as in line 85, and the return line from filter 79 to line 70, since the T and Z stages are acidic stages. The pH range desired is about 2-6, preferably about 5. At a pH of about 5, Mn and Cu dissolve, but any magnesium remains at the fibers. Alkali may be added before an alkali bleaching stage if desired; the (EP) stage (as would be a peroxide stage) of FIG. 4 is alkali, so that alkali could be added to the line 86 to adjust the pH.

Figure 5:
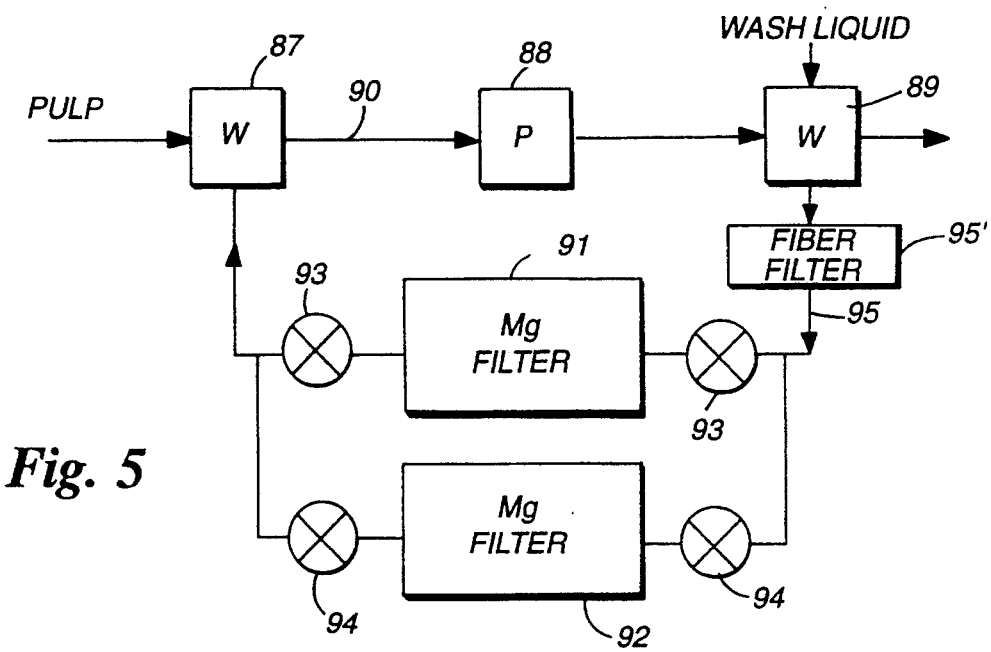
FIG. 5 is a detail view of a treatment of filtrate between wash stages of a system that can be utilized in FIG. 4.

FIG. 5 schematically illustrates the same type of treatment as in FIG. 4 only for a "P" stage per se, and showing the various components in the filtrate return line in more detail. Pulp in line 90 passes through washer 87 (as from a Z stage), then to the P bleach stage 88, and to another washing stage 89. The filtrate from stage 89 is used as the wash water in stage 87. First and second magnesium filters 91, 92 are provided in the recirculatory line 95 from the wash stage 89 to the wash stage 87. Valves 93 are provided on opposite sides of the filter 91, while valves 94 are provided on opposite sides of the filter 92. Preferably a fiber filter 95' is provided in line 95 before the filters 91, 92 so as to remove fibers which might otherwise have a tendency to clog the magnesium filters 91, 92. The fiber filter 95' may be of any conventional type, such as the Ahldecker fiber filter sold by A. Ahlstrom Corporation of Helsinki, Finland.

Utilizing apparatus like that of FIG. 4, and the conditions within each of the stages 71, 73, and 75 described, effectively bleached pulp can be produced.

In utilizing the apparatus of FIG. 5, the filter 91 has the valves 93 associated therewith open, while the valves 94 associated with filter 92 are closed. Once the effectiveness of the magnesium filter 91 for removing heavy metals, such as Mn, Fe, Zn, Co, and Cu, deteriorates, the valves 93 are closed at the same time that the valves 94 are opened to put the filter 92 into service. Then the filter 91 is either replaced or cleaned of contaminants and put back in service. The filter 92 is used until it becomes contaminated, and then the process is repeated.

In use of the filters 91, 92, some magnesium will probably dissolve in the filtrate to form $Mg^{++}$ ion. While heavy (e.g., transition) metals such as Mn, Fe, Zn, Co and Cu have a negative affect on bleaching with peroxide or ozone, or delignification with oxygen, because they consume bleaching chemical, the magnesium ions have a positive affect. Therefore the magnesium ions associated with the magnesium chips in the filters 91, 92 attract heavy metals to the surface of the chips, and if dissolved in the pulp have a beneficial affect on bleaching.

Figure 6:
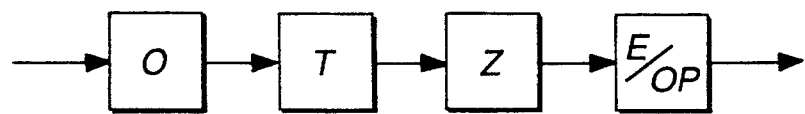
FIGS. 6 and 7 are two exemplary bleaching sequences that may be utilized in the practice of the invention.
Figure 7:
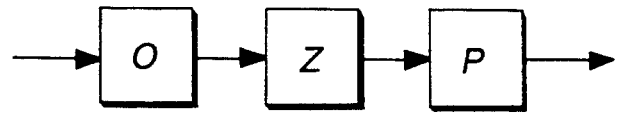

FIGS. 6 and 7 illustrate two typical bleaching sequences that can be used according to the invention. In FIG. 6 oxygen delignification (O) is followed by an EDTA, acid, or like treatment stage (T), followed by ozone bleaching (Z), followed by a caustic extraction stage, preferably having oxygen or peroxide associated therewith (Eop). In FIG. 7 oxygen delignification is followed by an ozone stage and one or more peroxide stages.

Figure 8:
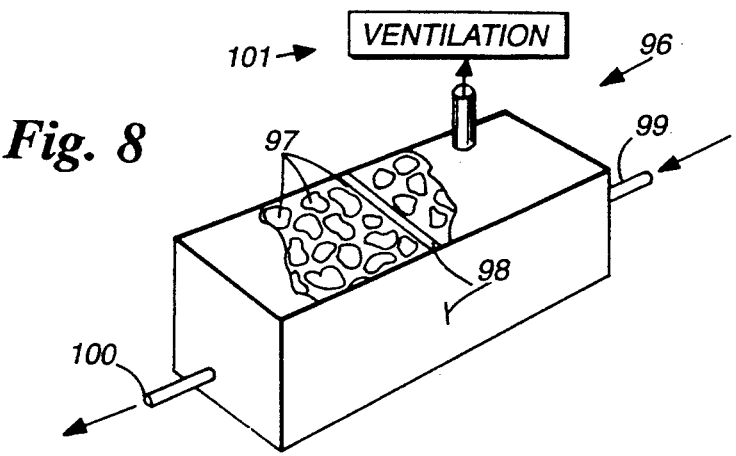
FIG. 8 is a schematic perspective view, with portions cut away for clarity of illustration, of an exemplary magnesium filter that could be utilized according to the invention.

FIG. 8 schematically illustrates an exemplary magnesium filter that can be utilized according to the invention, shown generally by reference numeral 96. Magnesium chips for removal of copper, iron, and like heavy metals from a liquid is known per se, and is very advantageous according to the invention for minimizing bleaching chemical use. The chips are shown schematically by reference numeral 97 in FIG. 8, and although they may take a variety of forms they preferably are in the shape of curled sawdust and have a maximum dimension of about three millimeters or less (e.g. about one to three millimeters or less). The chips 97 are disposed in a housing 98 which may have one or more compartments, and filtrate to be treated passes into inlet 99 and passes through outlet 100 after following a torturous path within the housing 98, and for that purpose baffles and other flow directing elements may be provided in the housing 98.

As the magnesium chips 97 react with components in the filtrate within the filter 96, hydrogen gas, or other explosive gases, may form. In order to prevent the possibility of an explosion, a ventilation system—illustrated schematically at 101 in FIG. 8—is provided to remove the gases. The ventilation system 101 may include a small vacuum pump, or other conventional elements, to ensure proper removal of gases which form, or are released from the filtrate, in the housing 98. These gases are then passed to a safe disposal or conversion area.

It will thus be seen that according to the present invention ozone consumption can be minimized in a non-chlorine bleaching sequence, so as to make the non-chlorine bleaching sequence practical. Also, utilizing the teachings of the invention and the parent application a bleaching plant can be closed, or substantially closed.

While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent methods and procedures.

What is claimed is:

1. A method of treating filtrates from bleach plants of a paper pulp mill for bleaching cellulosic pulp, including utilizing at least one ozone, hydrogen peroxide, or oxygen bleaching stage, comprising the steps of:
   (a) washing the pulp in the paper pulp mill in a washer with a wash liquid prior to the ozone, hydrogen peroxide, or oxygen bleaching stage, the wash liquid including filtrate from another washing stage of a bleaching stage;
   (b) oxidizing the organic material in the filtrate used as wash liquid in step (a) prior to its use in step (a) in order to make the organic material less attractive to bleaching chemical in the bleaching stage;
   (c) ozone, hydrogen peroxide, or oxygen bleaching the washed pulp in said at least one bleaching stage; and
   (d) removing metallic ions from the filtrate in the pulp mill so as to minimize the consumption of ozone, hydrogen peroxide, or oxygen in step (c) by passing the filtrate through a magnesium filter.

2. A method as recited in claim 1 wherein step (c) is practiced by ozone bleaching the washed pulp in at least one hydrogen peroxide bleaching stage.

3. A method as recited in claim 1 wherein steps (a)–(d) are part of an oxygen-chelate-ozone-extraction bleach sequence.

4. A method as recited in claim 3 wherein the extraction stage is an Eop stage.

5. A method as recited in claim 1 wherein steps (a) through (d) are part of an oxygen-ozone-peroxide bleach sequence.

6. A method as recited in claim 1 wherein first and second magnesium filters are provided, each having magnesium chips therein; and wherein step (d) is practiced by the further steps of (e) determining when a first of the filters has become contaminated so that it is likely to soon no longer be effective; (f) taking the first filter out of service while generally simultaneously putting the second filter in service; and (g) recharging the first filter.

7. A method as recited in claim 1 wherein magnesium chips are disposed in a housing to provide the magnesium filter, and wherein step (d) is practiced by passing the filtrate through the housing in contact with the magnesium chips.

8. A method as recited in claim 7 comprising the further step of removing fibers from the filtrate before passing it into the magnesium filter.

9. A method as recited in claim 1 wherein magnesium chips shaped like curled sawdust and having a maximum dimension of about 3 mm or less are disposed in a housing to provide the magnesium filter, and wherein step (d) is practiced by passing the filtrate through the housing in contact with the magnesium chips having a maximum dimension of about 3 mm or less.

10. A method of treating filtrates from bleach plants for bleaching cellulosic pulp, including utilizing at least one ozone, hydrogen peroxide, or oxygen bleaching stage, comprising the steps of:
   (a) washing the pulp in a washer with a wash liquid prior to the ozone, hydrogen peroxide, or oxygen bleaching stage, the wash liquid including filtrate from another washing stage of a bleaching stage;
   (b) oxidizing the organic material in the filtrate used as wash liquid in step (a) prior to its use in step (a) in order to make the organic material less attractive to bleaching chemical in the bleaching stage;
   (c) ozone, hydrogen peroxide, or oxygen bleaching the washed pulp in said at least one bleaching stage;
   (d) removing metallic ions from the filtrate so as to minimize the consumption of ozone, hydrogen peroxide, or oxygen in step (c) by passing the filtrate through a magnesium filter comprising magnesium chips disposed in a housing, the filtrate passing through the housing in contact with the magnesium chips; and
   (e) venting explosive gases from the magnesium filter housing to preclude the possibility of an explosion in the filter.

* * * * *